United States Patent [19]

Hardtke et al.

[11] Patent Number: 5,018,607

[45] Date of Patent: May 28, 1991

[54] HYDRAULIC DASHPOT FOR PIPELINE SYSTEMS

[75] Inventors: Hans-Herlof Hardtke, Zeven; Jörg Bernert, D-Zeven-Hofkoh, both of Fed. Rep. of Germany

[73] Assignee: Lisega GmbH, Fed. Rep. of Germany

[21] Appl. No.: 351,631

[22] Filed: May 15, 1989

[30] Foreign Application Priority Data

May 19, 1988 [DE] Fed. Rep. of Germany ....... 3817058

[51] Int. Cl.$^5$ ............................................. F16F 9/34
[52] U.S. Cl. ..................... 188/282; 188/317; 188/322.15; 137/512.5; 137/513.7
[58] Field of Search ............... 188/282, 317, 322.15, 188/280, 322.13, 322.14; 137/512.5, 513.7

[56] References Cited

U.S. PATENT DOCUMENTS

| 4,079,750 | 3/1978 | Ludwig | 137/513.7 |
| 4,553,883 | 11/1985 | Brooks | 188/282 X |
| 4,588,053 | 5/1986 | Foster | 188/282 X |

FOREIGN PATENT DOCUMENTS

| 3720979 | 1/1989 | Fed. Rep. of Germany | 188/282 |
| 1060824 | 4/1954 | France | 188/317 |
| 630954 | 7/1963 | France | 188/317 |
| 178035 | 10/1983 | Japan | 188/282 |
| 129486 | 7/1985 | Japan | 188/280 |
| 301761 | 12/1928 | United Kingdom | 188/280 |

Primary Examiner—George E. A. Halvosa
Attorney, Agent, or Firm—Diller, Ramik & Wight

[57] ABSTRACT

A hydraulic dashpot for supporting pipes or similar loads comprises a cylinder having a piston mounted for displacement therein, the piston setting-off the cylinder chambers which are in fluid communication with a fluid storage chamber, and the piston having an inner chamber housing a valve seat body of a main control valve. The main control valve includes a pair of piston-type valve members reciprocally carried by the valve seat body and biased by a spring. The inner chamber and valve seat body have opposing peripheral surfaces and one of these surfaces is provided with a groove running the length thereof and at each end being merged with axial grooves which places the axial opposite ends of the inner chamber in fluid communication with each other to prevent blockage/locking-up during dashpot operation.

19 Claims, 2 Drawing Sheets

HYDRAULIC DASHPOT FOR PIPELINE SYSTEMS

BACKGROUND OF THE INVENTION

The invention relates to a hydraulic dashpot for pipeline systems comprising a piston mounted for displacement in a fluid pressure cylinder, connecting members at the fluid pressure cylinder and a piston rod connected to the piston, a storage chamber for hydraulic fluid present in cylinder chambers on opposite sides of the piston, and the piston accommodating a main control valve having a valve seat body in which are displaceably mounted and spring-biased two opposed piston-type valve members each having at least one throttle bore.

RELATED PRIOR ART

Hydraulic dashpots operate to check or slow displacement of the connected component, e.g., a pipeline. Such hydraulic dashpots offer little resistance to slow pipe movement as might occur due to temperature change. However, in the case of sudden movements caused by unexpected load events the dashpot is operative to block fluid flow and a rigid connection is immediately established. If the direction of motion is reversed by counter-oscillation or the like or by another load event, the blocking operation is performed in the opposite direction.

If the piston and piston rod of the hydraulic dashpot move slowly, the main control valve housed in the piston is held open by spring action. In such case the hydraulic fluid may freely flow from one cylinder chamber into the other. Volume compensation for piston rod and piston movement and volume compensation because of hydraulic fluid temperature change takes place through a hydraulic fluid chamber which may be provided coaxially of the cylinder. The control valves of dashpots are extremely important from a functional standpoint because safety and reliability of the dashpots depend upon the correct operation of these control valves. If a control valve is blocked, the performance of the dashpot, as well as the load, e.g., the pipeline, suspended by the dashpot is impaired. Remedial measures have been provided, such as a relatively narrow bore at the piston-type valve element ahead of which is mounted a filter. However, in the course of time, clogging of the bore can not be avoided so that eventually the valve element does not operate satisfactorily. The use of a filter also necessitates a relatively large radial dimension with respect to the piston-type valve elements, as well as for the valve seat bodies and the piston. Thus, the total constructional size and volume of the dashpot is accordingly affected.

SUMMARY OF THE INVENTION

The latter described and other difficulties are readily overcome by the present invention. In case of a dashpot of the foregoing type, the invention is characterized in that at least one of the peripheral surfaces of the valve seat body and of the bore receiving the valve body are provided with circumadjacent grooves.

Due to such circumadjacent grooves, a trouble-free performance of the dashpot may be achieved. Undesired motionlessness of the valve elements in their fluid-blocking position is excluded. Due to the by-pass system at the main control valve, the valve elements are not locked and a smooth follow-up with constant force is insured. Quick pressure compensation also occurs in both cylinder chambers so that, in the respective position of the dashpot, the valve elements open safely. At the same time, due to the present invention, the dimensions of the main control valve are relatively reduced, and are less than those provided hitherto so that, although the dimensions of the dashpot are reduced, the efficiency is maintained.

Advantageously, the groove or grooves extend helically on the peripheral surface of the valve seat body or also over the length of the appertaining bore. Therefore, fluid flow passage from one cylinder chamber to the other can not be prevented, particularly by clogging as heretofore noted. The control valve elements reliably return to the position corresponding to a particular load event, and no longer remain in the blocking position.

According to another object of the invention, the cross-section of the helical groove is an acute angle open to the outside.

With the above and other objects in view that will hereinafter appear, the nature of the invention will be more clearly understood by reference to the following detailed description, the appended claims and the several views illustrated in the accompanying drawings.

PREFERRED EMBODIMENT OF THE INVENTION

Figure 1:
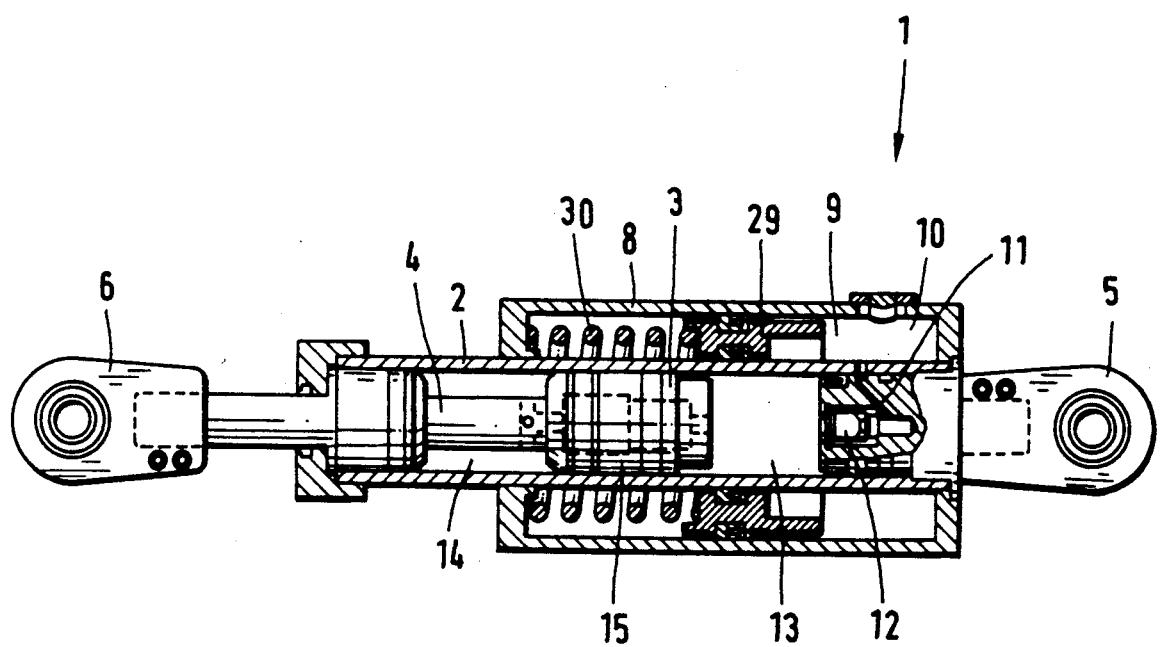
FIG. 1 is a fragmentary side elevational view of the dashpot of the invention, and illustrates a piston rod and piston mounted for reciprocal movement in a chamber of a fluid cylinder.

A dashpot 1 of the invention comprises a cylinder 2 housing a piston 3 and a piston rod 4 adapted to be relatively reciprocally displaced. Connecting members 5, 6 of the dashpot 1 are firmly secured to the cylinder 2, on the one hand, and to the piston rod 4, on the other hand.

The cylinder 2 is surrounded by a housing 8 comprising a fluid storage chamber 9 for hydraulic fluid 10. A conduit 11 extends from the fluid storage chamber through a balancing valve 12 to a front cylinder chamber 13.

A main control valve 15 is mounted in piston 3 between the front chamber 13 and a rear cylinder chamber 14.

The main control valve 15 contains a valve seat body 17 in which piston-type valve members or elements 18, 19 are positioned for reciprocal displacement. Between said valve members 18, 19 there is a compression spring 20. The piston-type valve members 18, 19 are provided with through bores 21, 22, respectively. Further, piston 3 carries piston sealing rings 23, 24. A central bore 26 extends through a cross bore 27 to the rear cylinder chamber 14, while a passage or hole 28 communicates with the front valve chamber 13. The hydraulic fluid in the storage chamber 10 is always kept under pressure by means of piston 29 which is biased by a spring 30.

Figure 2:
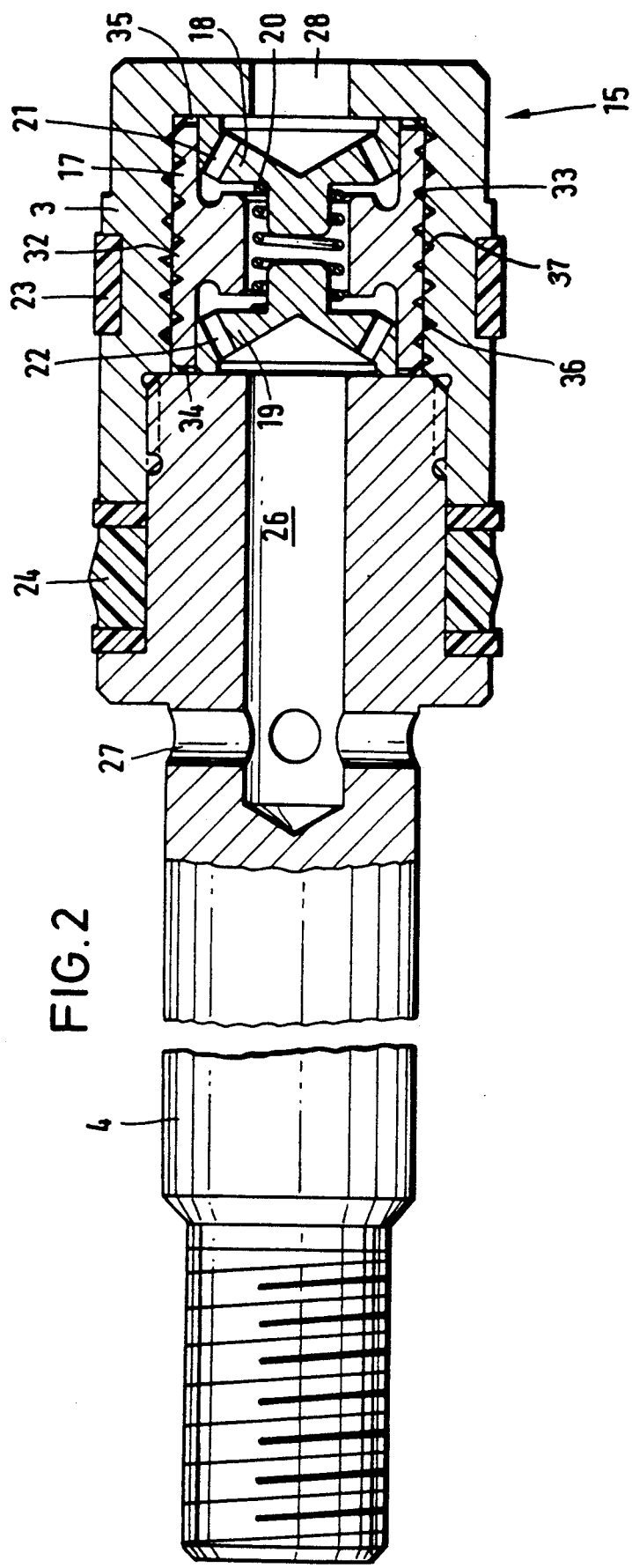
FIG. 2 is an enlarged fragmentary side elevational view of the piston of the dashpot shown in FIG. 1, and illustrates details of a pair of valve elements, a valve body, and a helical groove of the latter.

As is shown in FIG. 2, an outer peripheral surface 32 of the valve seat body 17 is provided with a groove 33 which, preferably, extends helically along the peripheral surface 32. The axial end faces of the valve seat body 17 are provided with radial slots 34, 35.

Due to the helical groove 33, a fluid by-pass is provided between the front cylinder chamber 13 and the rear cylinder chamber 14 which is always open to insure that, in case of a possible locked/blocked position of the main control valve, pressure compensation will occur between the two cylinder chambers 13, 14, thus permitting an opening of the piston-type valve members 18, 19 in case of probable locking.

Preferably, the cross-section of the helical groove 33 includes an acute angle opening radially outwardly. A corresponding radially inwardly opening helical groove 37 may be also provided in bore 36 which receives the valve seat body 17. Further, helical grooves may be provided not only at the outer periphery of the valve seat body, but also at bore 36 receiving the valve seat body 17, which, however, do not coincide. A depth of about 0.2 to 0.3 mm is preferable for the helical groove 33 (or the other unillustrated helical groove) and the acute angle thereof is preferably about 60°.

Although a preferred embodiment of the invention has been specifically illustrated and described herein, it is to be understood that minor variations may be made in the apparatus without departing from the spirit and scope of the invention, as defined in the appended claims.

We claim:

1. A hydraulic dashpot for supporting loads comprising a cylinder having a piston mounted for displacement therein, said piston setting-off cylinder chambers of said cylinder, means for placing said cylinder chambers in fluid communication with a fluid storage chamber, said piston including an inner chamber housing a valve seat body of a main control valve, said main control valve further including a pair of piston-type valve members reciprocally carried generally within said inner chamber of said piston, each of said piston-type valve members including at least one through bore, means for biasing said piston-type valve members in a predetermined direction away from each other, said inner chamber and valve seat body having opposing peripheral surfaces, groove means in at least one of said peripheral surfaces for placing axially opposite ends of said inner chamber in fluid communication with each other, first and second ports opening into generally axially opposite ends of said piston inner chamber in generally opposing relationship to respective first and second of said vale members, and said first and second valve members normally closing generally radial fluid communication between said respective first and second ports and said groove means at respective first and second of said piston inner chamber opposite ends when said first and second valve members have been biased a predetermined maximum distance from each other in said predetermined direction and normally opening generally radial fluid communication between said respective first and second ports and said groove means at said first and second piston inner chamber opposite ends when said first and second valve members are spaced closer to each other than said predetermined maximum distance in said predetermined direction to allow fluid flow between said first and second ports.

2. The hydraulic dashpot as defined in claim 1 wherein said groove means includes a generally helical groove.

3. The hydraulic dashpot as defined in claim 2 wherein said groove means is of a generally acute angle cross-sectional configuration.

4. The hydraulic dashpot as defined in claim 2 wherein said groove means is formed in said inner chamber peripheral surfaces.

5. The hydraulic dashpot as defined in claim 2 wherein said groove means is formed in said inner chamber peripheral surface and said valve seat body peripheral surface.

6. The hydraulic dashpot as defined in claim 2 wherein said groove means includes a generally radial slot at each axial end of said valve seat body.

7. The hydraulic dashpot as defined in claim 6 wherein said groove means is of a generally acute angle cross-sectional configuration.

8. The hydraulic dashpot as defined in claim 6 wherein said groove means is formed in said inner chamber peripheral surfaces.

9. The hydraulic dashpot as defined in claim 6 wherein said groove means is formed in said valve seat body peripheral surface.

10. The hydraulic dashpot as defined in claim 6 wherein said groove means is formed in said inner chamber peripheral surface and said valve seat body peripheral surface.

11. The hydraulic dashpot as defined in claim 2 wherein said groove means is formed in said valve seat body peripheral surface.

12. The hydraulic dashpot as defined in claim 11 wherein said groove means includes a generally radial slot at each axial end of said valve seat body.

13. The hydraulic dashpot as defined in claim 12 wherein said groove means further includes a generally radial slot merging with said generally helical groove at each axial end of said valve seat body.

14. The hydraulic dashpot as defined in claim 12 wherein said groove means is of a generally acute angle cross-sectional configuration.

15. The hydraulic dashpot as defined in claim 1 wherein said groove means includes a generally radial slot at each axial end of said valve seat body.

16. The hydraulic dashpot as defined in claim 1 wherein said groove means is of a generally acute angle cross-sectional configuration.

17. The hydraulic dashpot as defined in claim 1 wherein said groove means is formed in said inner chamber peripheral surfaces.

18. The hydraulic dashpot as defined in claim 1 wherein said groove means is formed in said valve seat body peripheral surface.

19. The hydraulic dashpot as defined in claim 1 wherein said groove means is formed in said inner chamber peripheral surface and said valve seat body peripheral surface.

* * * * *